United States Patent [19]
Vortriede et al.

[11] Patent Number: 5,707,192
[45] Date of Patent: Jan. 13, 1998

[54] PANEL—FASTENER CONNECTOR CLIP

[75] Inventors: Margaret M. Vortriede, Grosse Pointe Park; Roger J. Khami, Troy; Thomas D. Goebel, Monroe, all of Mich.

[73] Assignee: Ford Motor Company, Dearborn, Mich.

[21] Appl. No.: 746,057

[22] Filed: Nov. 6, 1996

[51] Int. Cl.⁶ .......................... F16B 37/02; F16B 37/04; F16B 43/02

[52] U.S. Cl. .......................... 411/175; 411/526; 411/546; 411/999

[58] Field of Search .................................. 411/174, 175, 411/525, 526, 527, 546, 547, 970, 999

[56] References Cited

U.S. PATENT DOCUMENTS

| | | |
|---|---|---|
| 2,399,958 | 5/1946 | Tinnerman ........................ 411/175 |
| 2,824,480 | 2/1958 | Hotchkin . | 
| 3,189,077 | 6/1965 | Willis, Jr. et al. ................. 411/999 X |
| 3,561,075 | 2/1971 | Selinko ............................. 411/999 X |
| 4,010,519 | 3/1977 | Worthing ......................... 411/546 X |
| 4,755,090 | 7/1988 | Macfee, Jr. et al. .............. 411/174 X |
| 5,039,264 | 8/1991 | Benn . | 
| 5,423,647 | 6/1995 | Suzuki . |

FOREIGN PATENT DOCUMENTS 1323772  7/1987  U.S.S.R. .................... 411/174

*Primary Examiner*—Neill R. Wilson
*Attorney, Agent, or Firm*—David B. Kelley

[57] ABSTRACT

A clip is installable on the edge area of a panel to assume a tight or floating condition centered on a fastener hole in the panel. The clip includes at least one prong or similar gripper mechanism designed to hold the clip-panel in place on a fastener while the fastener is being tightened. The clip further includes a pressure limiting mechanism for limiting the pressure exerted by the clip walls on the panel when the fastener is in its final tightened position. The clip can also be used as a fastener means.

11 Claims, 3 Drawing Sheets

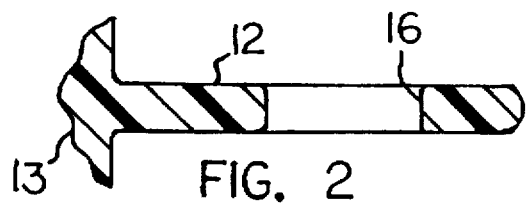
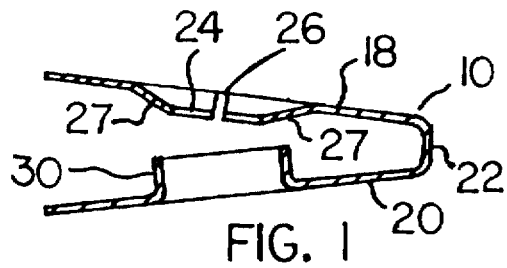
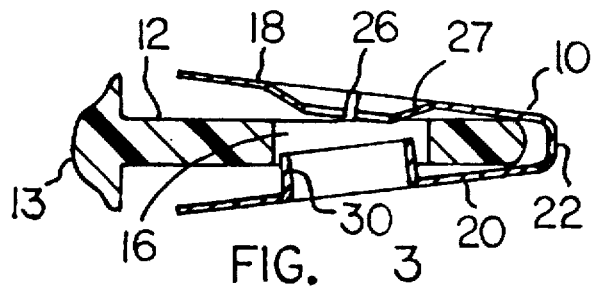
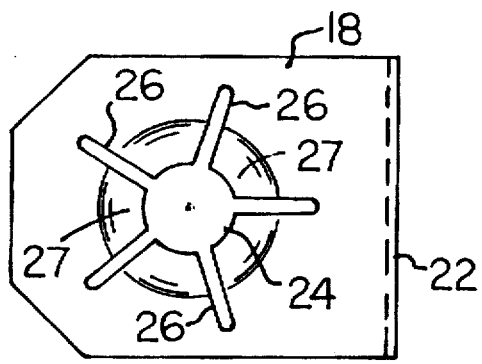
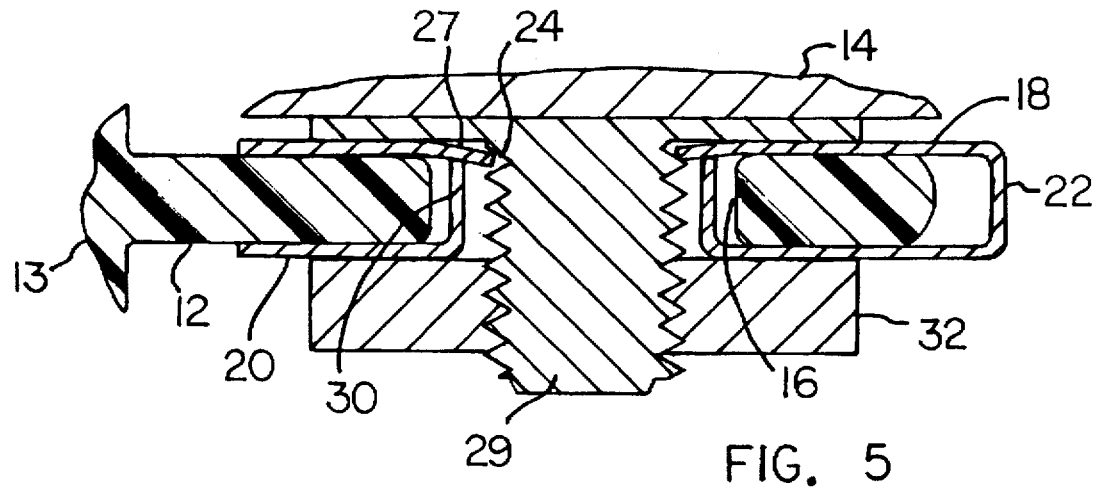

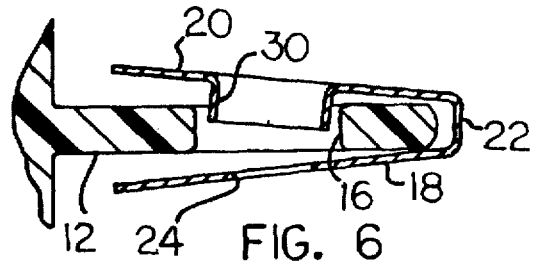
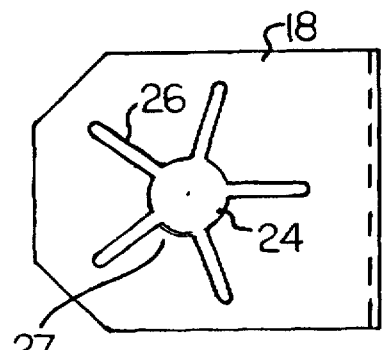
FIG. 6
FIG. 7
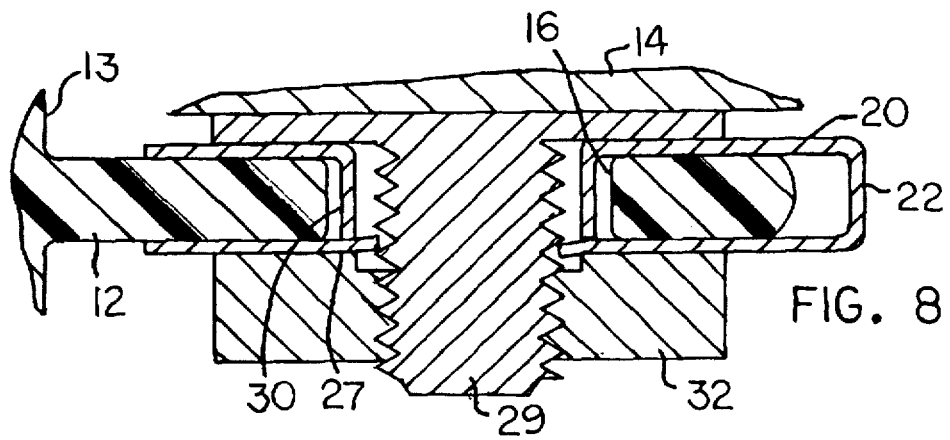
FIG. 8
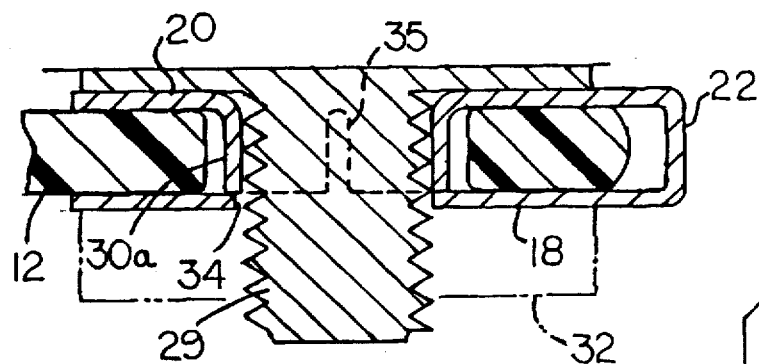
FIG. 10
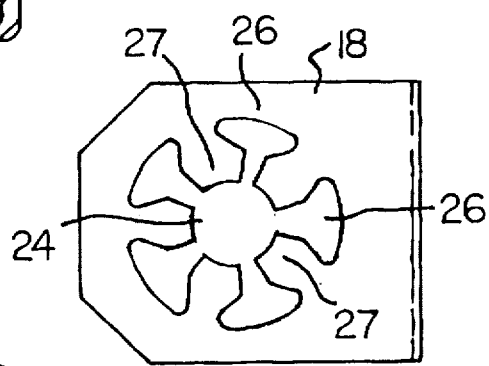
FIG. 9
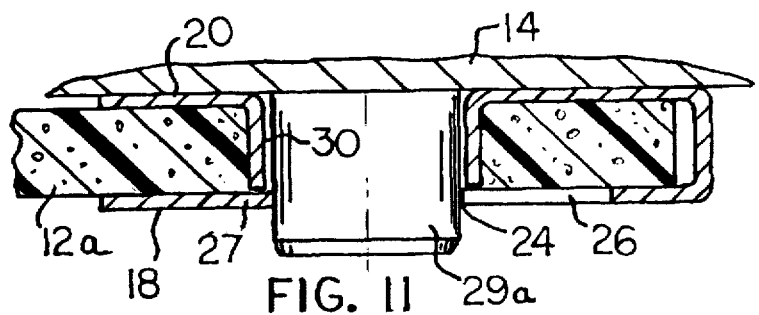
FIG. 11

5,707,192

PANEL— FASTENER CONNECTOR CLIP

BACKGROUND OF THE INVENTION

1. Field of the Invention

This invention relates to a clip installable on the edge of a panel to facilitate the process of installing the panel on a threaded fastener. The clip includes means for limiting compressive forces exerted by the clip on the panel when the fastener is tightened. The clip can also be used as a fastener.

2. Description of the Related Prior Art Developments

In certain instances it is desirable to install a box or other component on the underside of an overhanging support structure or against a vertical surface, using threaded fasteners as the connecting mechanism. Typically the component to be hung or suspended is formed with two or more flat flanges adapted to be positioned against the support structure surface. The support structure is provided with plural fastener studs spaced apart according to the spacing of fastener holes in the flanges, whereby the component can be manually pushed into a position wherein the fastener studs extend through the fastener holes. A nut can be threaded onto the end of each fastener stud to exert clamp forces on the flanges, so that the component is retained in place on the support structure.

In order to compensate for manufacturing tolerances in component manufacture and fastener stud spacing, the fastener holes in the flanges are sometimes made oversize relative to the fastener stud diameter. This presents a problem in that the component has to be manually supported while the fastener nuts are being threaded onto the studs. Also, the nuts have to be torqued to a high enough value to ensure that the component will remain in a fixed position after the nuts have been tightened down. The problem is somewhat magnified in automotive applications, where vibrational forces can have a loosening effect on the nuts; the nuts should be relatively tight in order to effectively resist the vibrational forces.

Many components used in automotive applications are formed of plastic. When such plastic components are suspended, as described above, the flanges on the component can be subjected to relatively high compressive loads by the fastener nuts. Such high loads, in combination with vibrational forces can lead to material creep, or other failure of the plastic.

The present invention is concerned with a clip that can be inserted onto the edge area of a component flange (or any panel) to limit the compressive forces exerted by a fastener stud and nut assembly. The clip additionally has a stud gripper capability, whereby the flange or panel is automatically held in place on the fastener studs while the fastener nuts are being applied and tightened on the studs. The component can be pushed into place against the support structure and then released while the nut-tightening operation is being performed; the clips on the component flanges grip the fastener studs to hold the component in place without human assistance.

In extended practice of the invention, the clip can be used as a fastener means to retain any component on a support structure while limiting compressive forces on the component.

Various types of clips have been used in the past to facilitate the process of mounting a panel or flange on a threaded stud or bolt. U.S. Pat. No. 5,039,264 shows a metal clip having two spaced legs adapted to grip opposite surfaces of the structure on which the clip is to be installed. The clip has a self-contained nut on one of its legs, and a circular protrusion on the other leg for locating the clip. U.S. Pat. No. 5,039,264 is believed to be representative of the art relating to fastener clip devices.

SUMMARY OF THE INVENTION

The present invention concerns a clip having first and second walls adapted to seat against opposite surfaces of a panel in sandwich fashion, whereby the clip is retained on the panel. In practice the panel can be a flange extending from a component for mounting the component on a support structure.

A special feature of the clip is that it can be easily and quickly installed on the panel, without welding or interference fit assembly operations. The clip can have a loose floating fit on the panel.

The flange (panel) has a hole adapted to encircle (or receive) a fastener stud extending from a pre-existing support structure, whereby a fastener nut can be threaded onto the stud to hold the component in place. The clip of the present invention comprises one or more prongs adapted to achieve an interference fit with the threads of the fastener stud when the component is pushed into place, such that the component is precluded from dropping out of position while the nut is being threaded onto the stud.

The clip of the present invention further includes a tubular wall or protrusion extending from one of the clip major walls so as to be located in a fastener hole in the flange (or panel). When the nut is tightened on the fastener stud the protrusion abuts the gripper prongs on the clip to limit the axial compressive forces applied to the flange (or panel). This pressure limiter action protects the flange material from material creep or excessive stresses that could lead to premature failure.

The major walls of the clip have relatively large surface areas that provide extensive surface area contact with the work surfaces (e.g. the flange and the nut), such that the component is adequately locked in place, even thought the compressive holding forces are relatively low. Also, the clip is designed to have a floatable disposition on the panel (or flange), such that multiple clips on different areas of the panel can align with fastener studs that may not be precisely spaced according to the spacing of the fastener holes in the panel.

When the panel is to be retained on the support structure with a single fastener, the clip can have a precision fit in the panel fastener hole, since hole spacing tolerances are not a factor in such installations.

In some cases the clip can be used as a fastener device, in place of the aforementioned fastener nut. For example, in a situation wherein the support structure is provided with a smooth-surfaced pin or projection, the clip can be first installed on the edge area of a panel, after which the panel can be manipulated so that the prongs on the clip exert a gripper force on the pin, sufficient to retain the panel in place on the support structure. The pin could be knurled or serrated. In the installed condition of the panel the tubular protrusion on one of the clip major walls abuts the prong area on the other major wall to limit compressive forces on the panel.

Further features of the invention will be apparent from the attached drawings and description of illustrative forms of the invention.

BRIEF DESCRIPTION OF THE DRAWINGS

FIG. 1 is a sectional view of a clip embodying the invention.

FIG. 2 is a fragmentary sectional view taken through a plastic panel that is to receive the FIG. 1 clip.

FIG. 3 is a sectional view showing the clip installed on the panel.

FIG. 4 is a top plan view of the FIG. 1 clip.

FIG. 5 is an enlarged sectional view showing the clip-panel assembly mounted to the underside of a support structure by means of a depending fastener stud and threaded nut.

FIG. 6 is a view taken in the same direction as FIG. 3, but showing another clip constructed according to the invention.

FIG. 7 is a bottom plan view of the clip depicted in FIG. 6.

FIG. 8 is a view taken in the same direction as FIG. 5, but showing the clip-panel assembly of FIG. 6.

FIG. 9 is a plan view of a third clip construction embodying the invention.

FIG. 10 is a view taken in the same direction as FIGS. 5 and 8, but showing a further clip used in practice of the invention.

FIG. 11 shows the clip of FIG. 8 used in a different manner, as a fastener device.

DESCRIPTION OF PREFERRED EMBODIMENTS OF THE INVENTION

Figure 12:
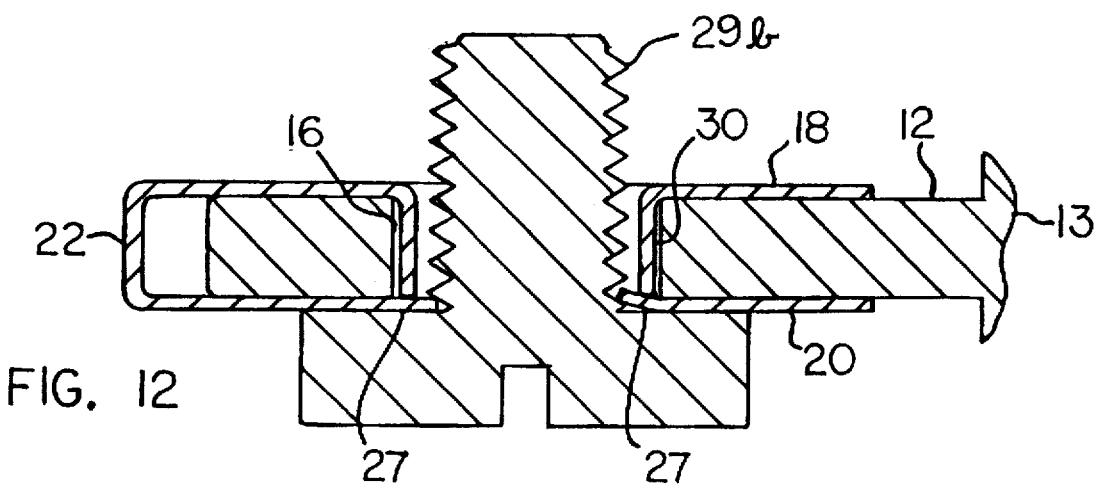
FIG. 12 is a sectional view taken through a clip of the invention, showing the clip installed on a panel for retaining a threaded fastener on the panel.

Referring to the drawings, and particularly FIGS. 1 through 5, there is shown a clip 10 installable on the edge area of a panel 12. In practice the panel can be a flange integral with a larger component 13, e.g. a storage box, that is to be mounted on an overhead support structure. That structure is broadly referenced in FIG. 5 by the numeral 14.

The flange (panel) 12 may have one or more fastener holes 16 spaced therealong; a separate clip 10 will be installed on the flange at each fastener hole. As shown in FIG. 1, the clip comprises a first major wall 18, a second major wall 20, and a web 22 interconnecting the two walls. The thickness dimension of web 22 is approximately the same as the thickness dimension of panel 12, such that when walls 18 and 20 are clamped against opposite surfaces of the panel the walls essentially will lie flat against the panel along the entire area of each wall 18 or 20.

As shown in FIG. 1, the clip has a V-shaped profile, with web 22 being at the apex of the V, and walls 18 and 20 diverging from web 22. As shown in FIG. 4 each wall 18 or 20 is essentially square in the plan dimension, whereby each wall has extensive surface area engagement with panel 12 when the panel is fastened in place, per FIG. 5. The square configuration is not critical; the primary aim is to achieve extensive area engagement of the clip surfaces on the panel.

Wall 18 of the clip has a circular opening 24, and five radial slots 26 contiguous with the opening, whereby five radial prongs 27 are formed around the edge of the opening. Each prong 27 is deflectable, to a limited extent, around its connection point with wall 18. The diameter dimension of opening 24 is somewhat smaller than the outside diameter of a threaded pin or fastener stud 29 that depends from support structure 14, on which panel 12 is to be mounted, whereby prongs 27 are enable to have an interference fit with the thread surfaces on stud 29.

Figure 13:
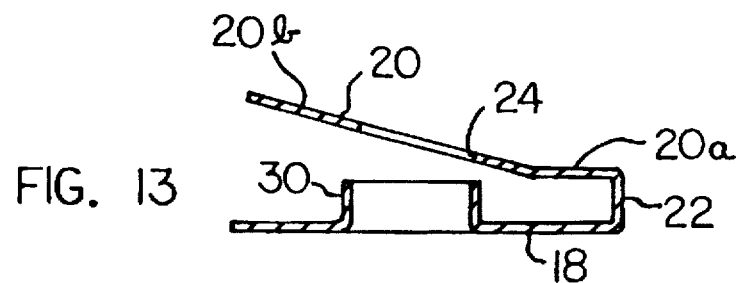
FIG. 13 is a view taken in the same direction as FIG. 1, but illustrating another embodiment of the invention.
Figure 14:
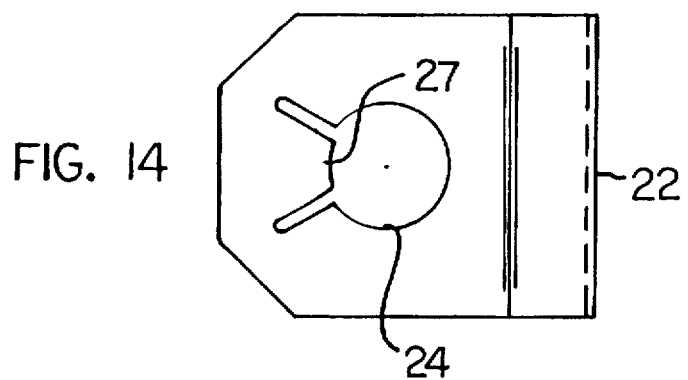
FIG. 14 is a top plan view of the FIG. 13 clip.

The number of prongs can be varied while still practicing the invention. FIGS. 13 and 14 show a clip of the present invention having a single prong 27. The prong is designed to penetrate into the thread space on the stud to cause the clip to be retained on the stud. The clip of FIGS. 13 and 14 is an alternative to the clip of FIGS. 1 and 4.

Referring to FIGS. 1 through 4, wall 20 of the clip has a tubular protuberance (wall) 30 extending toward wall 18, such that when the V-shaped clip is forced edgewise onto panel 12 tubular wall 30 rides along the panel lower surface and then into fastener hole 16. The outside diameter of tubular protuberance 30 is somewhat less than the width dimension of fastener hole 16 so that clip 10 is loosely retained in a floating condition on the panel (in the FIG. 3 position). The floating disposition of each clip 10 on panel 12 compensates for tolerances in the spacing of different fastener studs 29, whereby each clip is enabled to align with and grip an associated stud. Tubular wall 30 serves as a retainer for retaining clip 10 on panel 12, and also as a compression limiter when nut 32 (FIG. 5) is tightened on stud 29.

Fastener hole 16 can be circular or some other configuration, e.g. square or hexagonal. The primary criterion is that there be a clearance between the edge of hole 16 and the tubular wall 30, to compensate for tolerances in the spacing of fastener studs 29. Wall 30 is shown as a tubular protuberance; however, the wall could be non-tubular while still performing its function as a compression limiter when nut 32 (FIG. 5) is tightened on stud 29.

In situations where panel 12 is to be retained on the support structure with a single fastener assembly the clearance between tubular protuberance 30 and the hole in panel 12 can be reduced, since there is then no need to compensate for tolerances in the spacing of different fastener studs (pins).

When clips 10 have been installed on panel 12 the associated component 13 can be pushed onto support structure 14 such that opening 24 on each respective clip ratchets over the threads on the respective studs 29. When panel 12 has moved to the limit of its motion the prongs 27 will have an interference fit on the threads of each stud 29, whereby component 13 is retained against slippage off studs 29. The prongs 27 exert gripper forces on the stud threads.

A threaded nut 32 is threaded onto each stud 27 to exert an axial force on clip wall 20, whereby the panel 12 is locked to the support structure 14. During the final stages of the nut tightening operation the end of tubular wall 30 abuts prongs 27 to limit the compressive squeezing pressures exerted by walls 18 and 20 on panel 12. Wall 30 acts as a pressure limiting mechanism for preventing undersirably high compression loads on the panel. The panel is protected against creep or other desired failure.

The clip shown in FIGS. 1 through 4 comprises two walls 18 and 20 having the same shape and size (i.e. the shape shown in FIG. 4). However, the respective walls could have slightly different sizes or shapes while still practicing the invention. By making one wall (18 or 20) slightly smaller than the other wall, it is possible to facilitate a correct installation of the clip on panel 12; e.g. an installation where wall 18 is always on the upper face of panel 12, as shown in FIG. 3. The person installing the clip is instructed to make certain that the smaller wall is always on the upper (or lower) face of the panel.

As shown in FIG. 1, the central area of wall 18 occupied by prongs 27 is downwardly dished or deformed. This is for the purpose of enabling the ends of the prongs to better conform to the thread spaces on stud 29. The prong ends can be displaced from the plane of wall 18 slightly, as shown in FIG. 5, to ensure that they will be received in a thread space rather than abutting a thread outer edge or unthreaded area of the stud. However, the dished configuration is not essential; a flat prong configuration can also be used (as shown in FIG. 6).

Referring to FIGS. 6 through 8, there is shown a variant of the clip depicted in FIG. 1. The FIG. 6 clip is similar to the FIG. 1 clip in all respects except that the prong area of wall 18 is coplanar (flat) with the remaining area of the wall, rather than being dished. The FIG. 6 clip can be installed in a reversed orientation on panel 12, e.g. with wall 18 on the underside of the panel, and with wall 20 on the upperside of the panel. FIG. 8 shows the final positions of the panel and clip after nut 32 has been tightened onto the fastener stud 29. Tubular wall 30 abuts prongs 27 to limit the compressive forces exerted by walls 18 and on the panel 12 material. The FIG. 6 clip functions in essentially the same fashion as the FIG. 1 clip.

FIG. 9 shows a prong configuration that can be used to achieve prongs having greater deflectability. The radial slots 26 have widened areas at the points where the prongs join wall 18, whereby each prong has a relatively narrow dimension at the wall 18 joinder point. Each prong in the FIG. 9 clip is thus more easily deflected than the corresponding prong in the FIG. 1 or FIG. 7 clip.

The "compression limiter" feature can be used without using the retention prongs 27. Thus, in an alternate arrangement, not shown, central hole 24 can have a diameter that is the same as the internal diameter of tubular wall 30 (FIG. 8); in this case slots 26 are not used. With such an arrangement the clip can be loosely positioned on panel 12 (or similar member to be fastened) by the disposition of tubular wall 30 extending within the panel. When nut 32 is tightened on the stud, wall 30 acts as a compression limiter, as in the arrangement depicted in FIG. 8.

FIGS. 13 and 14 show a variant of the clips depicted in FIGS. 1 and 6. As shown in FIG. 13, wall 20 of the clip includes a wall area 20a extending parallel to wall 18, and another wall area 20b diverging away from wall 18. This configuration (or divergence) differs slightly from the divergent configuration depicted in FIGS. 1 and 6. However, the clip of FIGS. 13 and 14 functions essentially the same as the previously described clips.

In a further arrangement, not shown, walls 18 and 20 can be parallel in the unstressed state. The resiliency of the clip material can allow the clip walls 18 and 20 to be momentarily spread apart, to a divergent condition, thereby permitting the clip to be installed on panel 12. With the clip positioned on the panel, the clip walls 18 and 20 resiliently return to a condition wherein walls 18 and 20 extend along opposite faces of the panel.

FIG. 10 shows a variant of the invention wherein the tubular wall 30a acts as a pressure limiter and also as a fastener stud gripper means. The inner diameter of tubular wall 30a is preferably a close frictional fit on the thread edges on fastener stud 29. Therefore, when panel 12 is manipulated onto stud 29 the inner surface of tubular wall 30a will exert a gripper force on the stud, thereby retaining panel 12 in place on the stud while nut 32 is being tightened. Wall 30a can be provided with plural axial slots 35 to increase the gripping action.

Wall 18 has a circular opening 34 that has a close tolerance fit on the stud. Edge areas of opening 34 align with edge areas of tubular wall 30a to achieve the desired pressure limiter action.

FIG. 11 shows the clip of FIGS. 6 through 8 used as a fastener to retain a panel 12a on a support structure. This use of the clip eliminates the need for the fastener nut 32.

As shown in FIG. 11, support structure 14 has a smooth surface pin 29a projecting from the structure 14 surface. The pin can be molded as an integral part of structure 14, or the pin can be a separate element press fit into a hole in structure 14. The pin is gripped by prongs 27 of the clip 10, whereby panel 12a is fastened to support structure 14.

The hole 24 in clip wall 18 is sized to have a close sliding fit on the smooth surfaced pin 29a. The pin can be serrated or knurled. Assuming that clip 10 is first installed on panel 12a, the clip walls 18 and 20 are pressed together against the faces of panel 12a, the clip walls 18 and 20 are pressed together against the faces of panel 12a, after which the clip-panel assembly is telescoped onto pin 29a; hole 24 slides along the pin surface, with minimal deflection of the prongs 27 (although such deflection can occur as an incidental part of the installation process). If the hole 24 in clip wall 18 is made slightly smaller than the pin diameter, prongs 27 will deflect during the clip insertion process. When the panel-clip assembly is fully inserted onto pin 29a the clip is released, whereupon the clip wall 18 may spring slightly (imperceptibly) away from the face of panel 12a to cause prongs 27 to grip the pin surface. The movement of clip wall 18 to achieve the prong-pin grip action is very slight, such that clip wall 18 remains essentially parallel to clip wall 20, as shown in FIG. 11.

Tubular wall 30 limits the compressive forces on panel 12a, as in the previously described arrangements. The axial length of wall 30 can be slightly less than the wall thickness of panel 12a, in which case the clip walls 18 and 20 can exert an initial pinching action on panel 12a during the process of installing the clip on pin 29a; spring action of clip wall 18 relieves the pinching force so that the clip walls exert a desired pressure on the panel after the panel fastening operation.

FIG. 12 shows the clip of FIG. 7 installed on panel 12, with a threaded fastener 29b inserted through the tubular compression limiter wall 30 so that prongs 27 have gripping engagement with the fastener threads. The clip is used as a device for retaining the threaded fastener on panel 12 prior to threaded insertion of the fastener into a threaded hole of a support structure, not shown.

With fastener 29b retained on panel 12 the fastener can be turned around its axis to thread into a threaded hole in the non-illustrated support structure, whereby panel 12 is secured to the support structure. Wall 30 acts as a pressure limiter to prevent undue stress on panel 12.

FIGS. 11 and 12 merely illustrate added uses of the clip of this invention. The basic clip configuration can be used in various ways, as shown for example in FIG. 5, or FIG. 8, or FIG. 10, or FIG. 11, or FIG. 12.

It will be seen that the invention can take a range of different constructions. The clip of this invention is designed to have a retention means 30 for loosely retaining the clip on a panel that is to be fastened in place. Also, the clip includes a gripper means for gripping the threads of a fastener stud or pin whereby the panel is supported against dislocation off of the stud or pin. Further, the clip includes compression limiting means (30 or 30a) for limiting the pressure exerted by walls 18 and 20 on panel 12 when the nut is tightened.

Walls 18 and 20 have relatively large surface areas in facial contact with the panel 12 surfaces, so that the clip is precluded from prematurely loosening, even though the compressive pressures on panel 12 may be relatively low.

We claim:

1. A clip installable on the edge area of a panel that is equipped with a transverse fastener hole, said clip comprising:
   - a V-shaped wall structure that includes first and second walls, and a connecting web at the apex of the V; said first and second deflectable walls being connected to said web, so that said first and second walls can be moved toward one another into clamped positions against opposite surfaces of the panel;
   - said web having a width dimension that approximates the thickness dimension of the panel, whereby said first and second walls are enabled to lie flat against the panel surfaces; said first wall having an opening alignable with the fastener hole in the panel, and a plurality of radial slots contiguous with said opening for defining deflectable prongs;
   - said prongs having terminal ends extendible into thread spaces on a threaded fastener stud extending through the fastener hole in the panel, whereby the clip is retained on the fastener; and a tubular protrusion extending from said second wall for insertion into the fastener hole so that when the fastener is tightened to clamp said first and second walls against the panel said protrusion will abut said prongs to limit the compressive forces exerted by said first and second walls on the panel.

2. The clip of claim 1, wherein said first and second walls have extensive surface areas thereof in facial contact with the panel.

3. A clip installable on the edge area of a panel that is equipped with a transverse fastener hole for fastening the panel to another structure, said clip comprising:
   - a wall structure that includes first and second spaced walls, and a connecting web;
   - a protrusion extending from said second wall toward said first wall, so that when the first and second walls are clamped against opposite surfaces of the panel the protrusion extends through the fastener hole to abut said first wall, to limit the pressure exerted by said walls on the panel;
   - said first wall having a circular opening that has an edge adapted to grip a fastener pin extending through the fastener hole in the aforementioned panel, whereby the panel is retained on the pin without assistance.

4. The clip of claim 3, wherein said first wall has plural radial prongs bordering said circular opening for gripping the fastener pin.

5. The clip of claim 3, wherein said first and second walls diverge as they extend from said connecting web, whereby the clip has a V-shaped profile to facilitate slidable insertion of the clip onto the panel.

6. The clip of claim 3, wherein said protrusion is a tubular wall integral with said second wall.

7. The clip of claim 6, wherein said tubular wall has an outer side surface dimension that is significantly less than the corresponding dimension of the fastener hole in the panel, whereby the clip is adjustably positioned on the panel.

8. A clip installable on the edge area of a panel that is equipped with a transverse fastener hole for fastening the panel to another structure, said clip comprising:
   - first and second walls adapted to seat against opposite surfaces of the panel in sandwich fashion;
   - a tubular wall extending from said second wall toward said first wall for disposition in the aforementioned fastener hole, whereby the clip is loosely retained on the panel; said first wall having an opening therein having a dimension slightly less than the major diameter of a fastener stud extending through said transverse fastener hole, whereby the edge of said opening is adapted to have an interference fit with the stud thread;
   - said tubular wall having an end seatable against said first wall to limit the pressure exerted by said first and second walls on said panel when a nut is tightened on aforementioned stud.

9. The clip of claim 8, wherein said first wall has at least one radial slot contiguous with the edge of said opening to form a deflectable prong means adapted for insertion into the threads on the aforementioned fastener stud.

10. The clip of claim 9, wherein said end of the tubular wall is adapted to abut said prong means when the aforementioned nut is tightened on the stud.

11. The clip of claim 10, wherein said tubular wall has an outer side surface dimension that is significantly less than the corresponding dimension of the fastener hole in the panel, whereby the clip is adjustably positioned on the panel prior to tightening of the nut.

* * * * *